United States Patent [19]

Lutz

[11] Patent Number: 4,672,765
[45] Date of Patent: Jun. 16, 1987

[54] ILLUMINATED FISH ATTRACTION DEVICE

[76] Inventor: Erno B. Lutz, 850 Rubis Dr., Sunnyvale, Calif. 94087

[21] Appl. No.: 866,394

[22] Filed: May 23, 1986

[51] Int. Cl.⁴ ............................................. A01K 85/01
[52] U.S. Cl. ...................................................... 43/17.5
[58] Field of Search ................... 43/17.5, 42.03, 43.13, 43/42.22

[56] References Cited

U.S. PATENT DOCUMENTS

| | | | |
|---|---|---|---|
| 1,950,933 | 3/1934 | Snell | 43/17.5 |
| 2,234,243 | 3/1941 | Goertzen | 43/17.5 |
| 2,458,611 | 1/1949 | Long | 43/17.5 |
| 3,213,562 | 10/1965 | Salvin et al. | 43/17.5 |
| 3,466,787 | 9/1969 | Collins | 43/42.22 |
| 3,813,809 | 6/1974 | Frotiee | 43/43.13 |
| 3,824,731 | 7/1974 | Sandschaper | 43/17.5 |
| 3,874,109 | 4/1975 | Peterson | 43/42.22 |
| 3,898,759 | 8/1975 | Jensen | 43/43.13 |
| 4,028,839 | 6/1977 | Stubblefield | 43/43.13 |
| 4,070,784 | 1/1978 | Yokogawa et al. | 43/17.5 |

Primary Examiner—M. Jordan
Attorney, Agent, or Firm—Thomas E. Schatzel

[57] ABSTRACT

A fish attraction device having a case and wing and wing support members. The wing automatically assumes a diving angle when trolling and an upward angle when a fish is hooked. The case may be provided with a flashing light circuit which has a phosphorescent coated light bulb.

20 Claims, 7 Drawing Figures

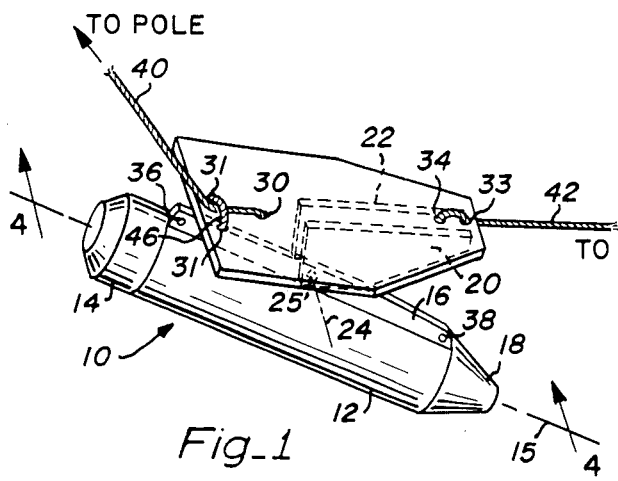
Fig_1
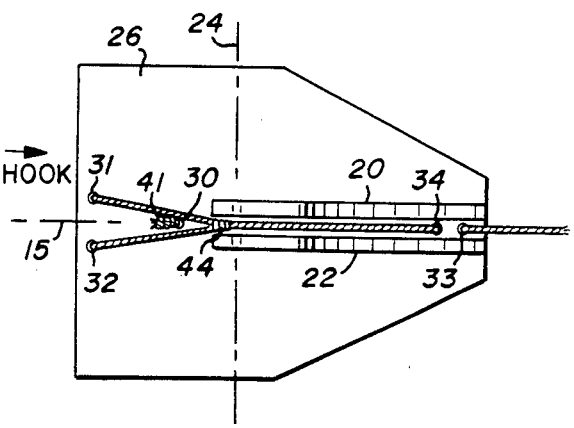
Fig_2
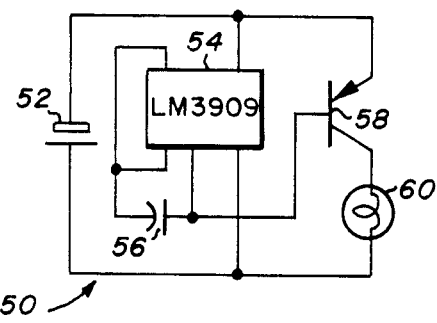
Fig_3
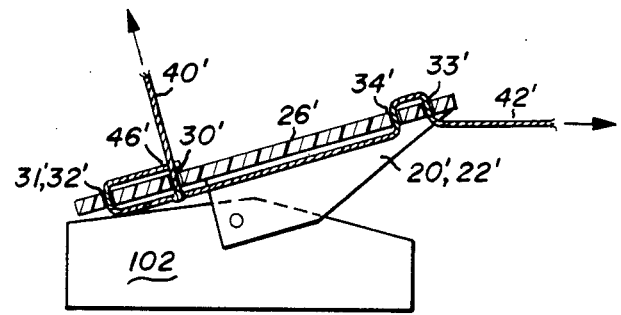
Fig_5
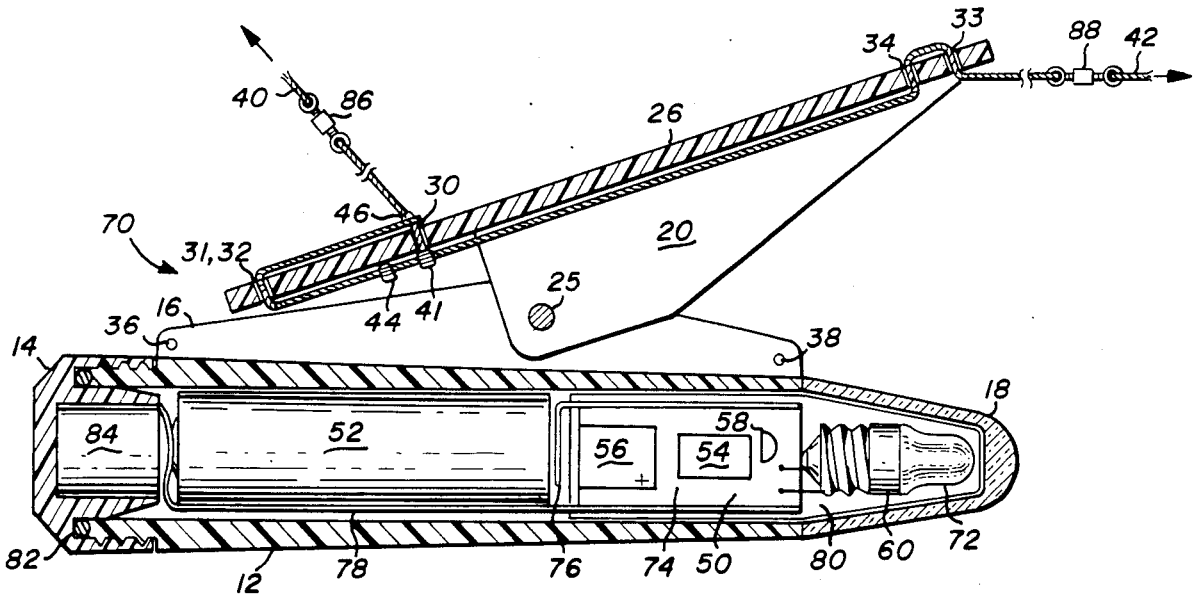
Fig_4

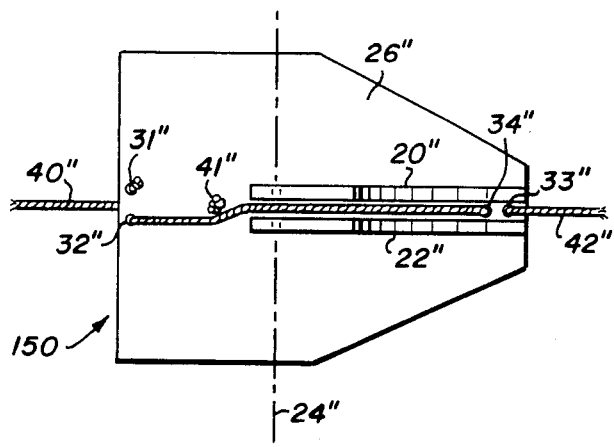
Fig_6
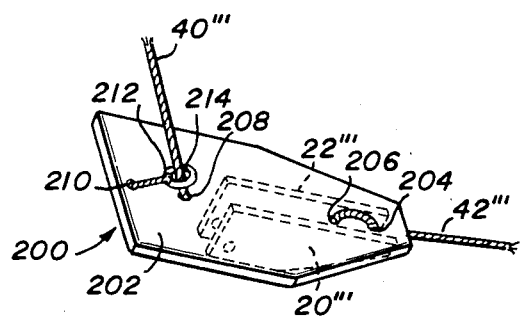
Fig_7 of 4,672,765

ILLUMINATED FISH ATTRACTION DEVICE

BACKGROUND OF THE INVENTION

1. Field of the Invention

The present invention relates generally to fish attraction devices and more particularly to a fish attraction device for use at greater water depths.

2. Description of the Prior Art

The sport of fishing requires skill and patience. The fish are not always attracted to the fisherman's hook and many fish prefer the cooler temperatures of the lower depths. The sunlight is weak and the water is usually murky at these depths. The fish are able to see only a short distance and so it is harder to attract them to the hook.

A number of devices have been developed to help solve this problem. Some lures have been coated with a phosphorescent material so that they glow under water and attract the fish. However, the glow slowly decreases and the lures must be brought up and recharged with light periodically.

A similar device uses a chemically activated light enclosed in a tube to lure the fish. As with the phosphorescent lure, the light decreases over time and loses its effectiveness. This device can only be used once.

Another device used to attract fish comprises a flashing light which is lowered into the water. The power control unit for the light unit remains above the water and is attached to the light unit by electrical wires. The electrical wires make the device hard to handle and impractical to use in trolling or casting situations Fish, in addition to being attracted to light, are also attracted to movement. Trolling involves trailing the fishing line behind a slow moving boat. The moving fish hook or lure is much more likely to get the attention of the fish. However, due to drag forces, the fish hook or lure cannot achieve a great depth during trolling.

In order to overcome this problem, some fishing devices have been developed which have a diving wing to which the lure or hook is attached. The wing is set at an angle relative to the fishing line such that a downward force is created which pushes the wing and the hook to a greater depth. When a fish strikes the attached hook, a release mechanism is triggered and the wing angle assumes a neutral attack position, such that the downward force is no longer produced. The wing is usually spring loaded or slidably mounted such that once the fish strikes the hook or lure, the wing assumes the neutral position. A problem with these devices is that the wing angle cannot be adjusted. Another problem is that the release mechanisms increase the weight of the devices and necessitate the use of heavier fishing line.

SUMMARY OF THE PRESENT INVENTION

It is therefore an object of the present invention to provide a fish attraction device which can operate in deep water.

It is another object of the present invention to provide a fish attraction device which has a self-contained flashing light.

It is a further object of the present invention to provide a fish attraction device with a flashing light which has a phosphorescent after-glow between the flashes.

It is another object of the present invention to provide a fish attraction device with a diving wing which can be set for different diving angles.

Briefly, the preferred embodiment of the present invention includes a battery powered flashing light circuit. The circuit is encapsulated in a water proof material. The light bulb is coated with a phosphorescent material which gives an after-glow between flashes. The encapsulated circuit and battery is placed inside a transparent waterproof case. A water tight cap attaches to and forms a water tight seal with the case. A dorsal fin is attached to the top of the case.

A wing member is attached to a wing support member which in turn is mounted to the dorsal fin. The wing member contains an anchor aperture, two forward and two rear wing apertures. A fishing line is passed through the anchor aperture and is tied off. A hook line, which is attached to a hook or lure, is passed under the wing member and through a first rear wing aperture and back through a second rear wing aperture to the bottom of the wing member. The hook line is then passed through a first forward wing aperture to the top side of the wing member, passed around the fishing line and is then passed through a second forward wing aperture to the bottom side of the wing member. The end of the hook line is then tied to the portion of the hook line between the second rear wing aperture and the first forward wing aperture.

An advantage of the fish attraction device of the present invention is that it can operate in deep water.

Another advantage of the present invention is that it has a reusable self-contained flashing light.

A further advantage is that the present invention has a flashing light which has a phosphorescent after-glow between flashes.

Another advantage of the present invention is that it has a diving wing which can be set for different diving angles.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a perspective view of a preferred embodiment of the fish attraction device of the present invention;

FIG. 2 is a bottom elevation view of the wing and wing support members of FIG. 1;

FIG. 3 is a schematic circuit diagram of the flashing light circuit of FIG. 1;

FIG. 4 is a cross-sectional view of the device shown in FIG. 1 taken along the line 4—4;

FIG. 5 is a side elevation view of an alternative embodiment of the present invention;

FIG. 6 is a bottom elevation view of the wing and wing support members of an alternative embodiment of the present invention; and FIG. 7 is a perspective view of the wing member of another alternative embodiment of the present invention.

DETAILED DESCRIPTION OF THE PREFERRED EMBODIMENTS

FIG. 1 illustrates a preferred embodiment of a fish attraction device in accordance with the present invention and referred to by the general reference numeral 10. The device 10 includes a water tight cylindrical case 12 and a water tight end cap 14 about one end. The case 12 has an axis of rotation 15 with a dorsal fin member 16 attached lengthwise to the top of case 12 and parallel with the axis 15. The case 12 is formed such that there is a conical tail light section 18 about the end opposite the end cap 14.

A first planar wing support member 20 and a second wing support member 22 are mounted to the dorsal fin 16 at points on a line 24. The members 20 and 22 are planar and parallel to one another with their surface planes parallel to the axis 15. Line 24 is perpendicular to the side surface of dorsal fin member 16 and perpendicular to the axis 15. Attachment of the support members 20 and 22 to dorsal fin 16 at the line 24 is accomplished by using a locking screw 25.

A planar wing member 26 is attached to wing support members 20 and 22 with its main planar surface perpendicular to the main planar surfaces of the members 20 and 22. FIG. 2 is a bottom elevation view of the wing member 26 and wing support members 20 and 22. Wing member 26 has an anchor aperture and first and second forward wing apertures 30, 31 and 32, respectively, located forward of line 24. Anchor aperture 30 is located along axis 15. Forward wing apertures 31 and 32 are located forward of aperture 30 along a line parallel with line 24. Wing member 26 also has first and second wing apertures 33 and 34 located to the rear of pivot line 24 and aligned parallel to axis 15. First rear wing aperture 33 is located to the rear of second rear wing aperture 34.

Referring again to FIG. 1, dorsal fin member 16 has a first fin aperture 36 located forward of line 24 and a second fin aperture 38 located to the rear of line 24. A fishing line 40 is passed through the anchor aperture 30 and is tied off at a knot 41. A hook line 42, which is attached as a hook or lure at the other end, is passed under the wing member and through first rear wing aperture 33 and back through second rear wing aperture 34 to the bottom side of the wing member 26. The hook line 42 is then passed through first forward wing aperture 31 to the top side of wing member 26, passed around fishing line 40 and is then passed through second forward wing aperture 32 to the bottom side of the wing member 26. The end of hook line 42 is then tied to the portion of the hook line located between the second rear wing aperture 34 and the first forward wing aperture 31 at a knot 44. The point where the hook line 42 loops around the fishing line 40 is known as a tie-point 46.

FIG. 3 is a schematic diagram of a preferred embodiment of the flashing light circuit of the present invention and is designated by the general reference number 50. A battery 52 powers the circuit 50 and may typically be a standard size AA flashlight battery. A pulser 54, for example, a National Semiconductor LM3909 device, is connected to a capacitor 56. The pulser 54 in combination with the capacitor 56 is connected to and controls a transistor 58. The transistor 58 in turn is connected to a light bulb 60 and switches power on and off to the light bulb 60. A standard disposable flashlight bulb can be used for bulb 60. When the circuit 50 is in operation, bulb 60 will flash at a rate dependent on the capacitor 56. The preferred rate is approximately sixty times per minute. The pulsing of bulb 60 has the additional advantage of extending the lifetime of the bulb.

FIG. 4 is a detailed cross-sectional view of the device 10 taken along the line 4—4 and with the flashing light circuit 50 mounted in place in the tail light section 18. In the preferred embodiment, the case 12, cap 14, dorsal fin 16, wing support members 20 and 22 and the wing member 26 are all made of a transparent injection molded plastic. However, in practice, only the tail light section 18 need be transparent. Alternatively, for example, the case 12 and cap 14 may be made of a polyester casting resin and the wing support members 20 and 22 and the wing member 26 may be made of a clear acrylic.

The case 12 is a hollow cylindrical tube which contains the components for the flashing light circuit 50. Light bulb 60 is positioned inside the tail light section 18. The light bulb 60 has a phosphorescent material coating 72. The phosphorescent material is phosphorescent zinc sulfide powder which is glued to the bulb 60. Phosphorescent zinc sulfide is preferred because it gives off a green color which propagates well in murky and deep water.

The pulser device 54, capacitor 56 and transistor 58 are all mounted on a board 74. Positive battery contact 76 and negative battery contact 78 are attached to the board 74 and form a holder for battery 52. Bulb 60, board 74 and contacts 76 and 78 are formed into an encapsulated capsule 80 using a clear resin. The capsule 80 further provides waterproof protection to the electrical components of the light circuit 50. Capsule 80 and battery 52 can be slidably removed from case 12 when cap 14 is removed.

Cap 14 is screwably mounted to the cylindrical case 12. An O-ring 82 is positioned intermediate the case 12 and cap 14 to form a water tight seal between cap 14 and case 12 when the cap 14 is secured in place. Cap 14 also contains within its interior a lead weight 84. Lead weight 84 acts as a counter weight to stabilize the device 10 when it is in water.

In operation, with the circuit 50 in place, battery 52 is inserted between contacts 76 and 78, and the bulb 60 begins to flash. The entire capsule 80 and the battery 52 are then slid into case 12 and the cap 14 sealed to the case 12. A lure or hook is then attached to hook line 42. The device 10 is then lowered into the water by fishing line 40 from a slow moving boat. For typical trolling, the boat will be moving at less than three miles per hour. As shown in FIG. 4, the fishing and hook lines 40 and 42 may be equipped with swivel-type eye-rings 86 and 88, respectively.

Once in the water, the force from line 40 forces the hook line 42 between the first and second forward wing apertures 31 and 32 to be forced rearward. When this occurs, the tie point 44 is located directly above aperture 30. When the device 10 is pulled through the water from aperture 30, the wing member 26 will be positioned such that it is in a dive angle. The wing 26 is shown in a dive angle position in FIG. 4. The device 10 will now generate a downward drag force and go to a substantial depth below the water surface depending on the length of the fishing line. For typical trolling, for example, the device 40 will go to a depth of about forty feet when eighty feet of fishing line is let out. The ratio of the length of the fishing line 40 to the depth achieved is about two to one. The locking screw 25 allows the wing 26 to be adjusted to different dive angles such that the depth achieved is different.

In the water, the flashing bulb 60 with its greenish after-glow between flashes, will attract fish to the lure or hook. When a fish is hooked, the hook line 42 will be pulled toward the rear. Knot 35 is pulled rearward and the loop of hook line 42 between apertures 31 and 32 is evenly pulled forward and partially through apertures 31 and 32. When this happens, fishing line 40 is also pulled forward and the tie point 46 moves forward to a position which is approximately half way between apertures 31 and 32. Wing member 26 will then be in an upward angle. The friction of the hook line 42 between apertures 33 and 34 ensures that the wing will remain in an upward angle even if the fish momentarily lets the hook line 42 go slack. The device 10 will now generate an upward lift force and can be reeled in more easily.

When the device 10 is not in use, the capsule 80 and battery 52 are removed from case 12. The battery 52 is disconnected and the bulb 60 stops flashing. The battery 52 can easily be replaced, so the device can be reused many times.

An alternative embodiment of the device can be used for still fishing, casting, and shallow trolling. Wing member 26 and support members 20 and 22 can be removed from dorsal fin 16. In this mode, fishing line 40 is attached to the first fin aperture 36 and hook line 42 is attached to second fin aperture 38. Without the wing member 26 and support members 20 and 22, the device assumes a position close to the surface when being pulled. The dorsal fin 16 provides stability in the water.

Another alternative embodiment of the device is illustrated in FIG. 5 and is designated by the general reference number 100. Elements similar to device 10 use the same reference numeral distinguished by a prime designation. The device 100 can be used for trolling at greater depths when a flashing light is not desired. The device 100 has a wing member 26' and wing supports 20' and 22' as in device 10. However, instead of a case 12, cap 14 and dorsal fin 16, device 100 has a weight member 102 to which the wing support members 20' and 22' are mounted The attachment of fishing line 40' and hook line 42' are similar to that of the device 10 and as the device 100 is pulled forward, it dives to greater depths. When a fish is hooked, the member 26' assumes an upward attack angle.

A wing member of another alternative embodiment of the device is illustrated in FIG. 6 and is designated by the general reference number 150. Elements similar to device 10 use the same reference numeral distinguished by a double prime designation. The device 150 is basically the same as device 10 except that the hook line 42" is not tied off at the portion of the hook line located between the second wing aperture 34" and the first wing aperture 31". Instead, hook line 42" is tied off at aperture 31" on the lower surface of wing member 26". The operation of device 150 is the same as that for device 10. Wing member 26" and wing support members 20" and 22" may be attached to a case 12 such as that in FIG. 1 or a weight member 102 such as shown in FIG. 5.

A wing member of another alternative embodiment of the device is illustrated in FIG. 7 and is designated by the general reference number 200. Elements similar to device 10 are designated by a triple prime designation. Device 200 has a wing member 202 which is substantially similar to wing member 26 of device 10. Apertures 204 and 206 correspond to apertures 33 and 34, respectively, of device 10. Fish line 40''' is passed through and attached to an aperture 208 which corresponds to aperture 30 of device 10.

Device 200 has a single forward aperture 210 located forward of aperture 208 instead of the forward wing apertures 31 and 32 of device 10. Hook line 42''' is passed through first wing aperture 204 to the top side of wing member 202 and then is passed through second wing aperture 206 to the bottom side. The hook line 42''' is then passed through forward wing aperture 210 to the top side of wing member 202. The hook line 42''' is then tied to a ring 212 which is positioned around fishing line 40'''. The ring 212 is allowed to slide up and down fishing line 40'''. The point where ring 212 contacts fishing line 40''' is a tie point 214. Wing member 202 and wing support member 20''' may be attached to a case 12 such as in FIG. 1 or a weight member 102 such as shown in FIG. 5.

The operation of device 200 is similar to that of device 10. As hook line 42''' is pulled rearward, ring 212 is pulled forward and tie point 214 moves forward. Wing member 202 will then be in an upward angle and generate an upward lift force.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A fish attraction device comprising:
an automatic, electrically controlled, flashing light circuit for producing a flashing light at a predetermined frequency, the flashing circuit including a light emitting device having a phosphorescent coating on its outer surface;
a water tight case for housing the flashing light circuit, the case being made of a transparent material about said light emitting device such that the flashing light from the flashing light circuit inside the case is visible outside the case;
a dorsal fin attached to the case for stabilizing the device in water; and
a water tight cap attached to and forming a water tight seal with the case.

2. The device of claim 1 wherein,
the phosphorescent coating is comprised of phosphorescent zinc sulfide.

3. The device of claim 1 wherein,
the dorsal fin has two apertures, the first aperture for receiving a fishing line from a fishing pole and a second aperture for receiving a fishing line attached to a fish hook.

4. The device of claim 1 wherein,
the case has a cylindrical shape.

5. The device of claim 1 wherein,
the case has a conical tail light section for housing said light emitting device of the flashing light circuit.

6. The device of claim 1 wherein,
the cap contains a lead counterweight.

7. A fish attraction device comprising:
a weight member having a longitudinal axis;
a wing support member mounted to the weight member about a mount line perpendicular to a longitudinal axis of the weight member;
a wing member attached to the wing support member and having a surface plane positioned at an angle less than 90° relative to said longitudinal axis of the weight member, a wing longitudinal axis, a wing anchor point and a first and a second forward wing aperture located forward of a plurality of rear wing apertures, said wing anchor point is located along said wing longitudinal axis, said first and second forward wing apertures are located along a line perpendicular to said wing longitudinal axis and forward of said wing anchor point, said rear wing apertures are located along said wing longitudinal axis;

a forward fishing line attached to said wing anchor point; and a rear hook line passed through said plurality of rear wing apertures and exiting on the bottom surface of the wing member, passed through said first forward wing aperture to the top side of the wing member, passed around the fishing line at a tie point, passed through said second forward wing aperture to the bottom side of the wing member and attached to the portion of the rear hook line located between the rear wing apertures and said first forward wing aperture.

8. The device of claim 7 wherein, the other end of the hook line is attached to a fish hook or lure.

9. The device of claim 7 further including, a second wing support member in parallel with the first support member, the first and second wing support members being mounted to the weight member and attached to the wing member, the weight member being intermediate said first and second wing support members.

10. The device of claim 7 wherein, the weight member comprises a flashing light circuit for providing a flashing light;

a water tight case for housing the flashing light circuit, the case having a transparent section such that the light from the flashing light circuit inside the case is visible from outside the case and having a longitudinal axis;

a water tight cap attached to and forming a water tight seal with the case; and a dorsal fin attached to the case and extending longitudinally for stabilizing the device in water.

11. The device of claim 10 wherein, the flashing light circuit further comprises a light bulb which has a phosphorescent coating.

12. The device of claim 10 wherein, the phosphorescent coating is comprised of phosphorescent zinc sulfide.

13. The device of claim 10 wherein, the other end of the hook line is attached to a fish hook or lure.

14. The device of claim 10 further including, a second wing support member in parallel with the first support member and the first and second wing support members being mounted to the dorsal fin and attached to the wing member, the dorsal fin being intermediate said first and second wing support members.

15. The device of claim 10 wherein, the case has a cylindrical shape.

16. The device of claim 10 wherein, the case has a conical tail light section for housing a light emitting device of the flashing light circuit.

17. The device of claim 10 wherein, the cap contains a lead counterweight.

18. The device of claim 1 wherein, the flashing light circuit is comprised of a battery;

a pulser connected in parallel with said battery;

a capacitor connected across said pulser; and a transistor connected to said pulser, said battery, and said light emitting device, wherein said light emitting device is connected to said battery such that said pulser controls said transistor and said transistor in turn switches power on and off to said light emitting device.

19. A fish attraction device comprising:

a weight member having a longitudinal axis;

a wing support member mounted to the weight member about a mount line perpendicular to a longitudinal axis of the weight member;

a wing member attached to the wing support member and having a surface plane positioned at an angle less than 90° relative to said longitudinal axis of the weight member, a wing longitudinal axis, a wing anchor point and a first and a second forward wing aperture located forward of a plurality of rear wing apertures, said wing anchor point is located along said wing longitudinal axis, said first and second forward wing apertures are located along a line perpendicular to said wing longitudinal axis and forward of said wing anchor point, said rear wing apertures are located along said wing longitudinal axis;

a forward fishing line attached to said wing anchor point; and a rear hook line passed through said plurality of rear wing apertures and exiting on the bottom surface of the wing member, passed through said first forward wing aperture to the top side of the wing member, passed around the fishing line at a tie point, and attached to said second forward wing aperture.

20. A fish attraction device comprising:

a weight member having a longitudinal axis;

a wing support member mounted to the weight member about a mount line perpendicular to a longitudinal axis of the weight member;

a wing member attached to the wing support member and having a surface plane positioned at an angle less than 90° relative to said longitudinal axis of the weight member, a wing longitudinal axis, a wing anchor point and a forward wing aperture located forward of a plurality of rear wing apertures, said wing anchor point is located along said wing longitudinal axis, said forward wing aperture is located forward of said wing anchor point, said rear wing apertures are located along said wing longitudinal axis;

a forward fishing line attached to said wing anchor point; and a rear hook line passed through said plurality of rear wing apertures and exiting on the bottom surface of the wing member, passed through said first forward wing aperture to the top side of the wing member, and attached to the fishing line by a sliding attachment means.

* * * * *